United States Patent
Henze et al.

(10) Patent No.: US 10,545,488 B2
(45) Date of Patent: Jan. 28, 2020

(54) METHOD FOR REPLACING A CONTROL UNIT IN A CONVEYING DEVICE

(71) Applicant: INTERROLL HOLDING AG, Sant' Antonino (CH)

(72) Inventors: Herbert Henze, Wermelskirchen (DE); Daniel Heinen, Wermelskirchen (DE)

(73) Assignee: INTERROLL HOLDING AG, Sant' Antonino (CH)

( * ) Notice: Subject to any disclaimer, the term of this patent is extended or adjusted under 35 U.S.C. 154(b) by 91 days.

(21) Appl. No.: 15/567,734

(22) PCT Filed: Apr. 20, 2016

(86) PCT No.: PCT/EP2016/058764
§ 371 (c)(1),
(2) Date: Oct. 19, 2017

(87) PCT Pub. No.: WO2016/169986
PCT Pub. Date: Oct. 27, 2016

(65) Prior Publication Data
US 2018/0203438 A1 Jul. 19, 2018

(30) Foreign Application Priority Data
Apr. 20, 2015 (DE) .................. 10 2015 106 026

(51) Int. Cl.
*G05B 19/418* (2006.01)
*H04L 29/12* (2006.01)
(Continued)

(52) U.S. Cl.
CPC ....... *G05B 19/41845* (2013.01); *B65G 13/07* (2013.01); *B65G 23/08* (2013.01);
(Continued)

(58) Field of Classification Search
CPC ............................................. G05B 19/41845
(Continued)

(56) References Cited

U.S. PATENT DOCUMENTS 5,180,344 A  1/1993 Hall
5,442,248 A  8/1995 Agnoff
(Continued)

FOREIGN PATENT DOCUMENTS

AT  508662   3/2011
AT  13066    5/2013
(Continued)

*Primary Examiner* — David T Welch
(74) *Attorney, Agent, or Firm* — Price Heneveld LLP

(57) ABSTRACT

A method is disclosed for replacing a defective control unit in a conveying device interconnected by a bus.
Conveying devices are used in logistics processes for fully automated and semi-automated conveying of goods by means of conveyor segments. These conveyor segments are controlled and monitored by control units. In order to minimize the downtime of the conveyor device, the described method for replacing a defective control unit in a conveying device interconnected by a bus can be used to ensure that a control unit can be replaced promptly and reliably.
The method according to the invention allows automatic detection of a defect in a control unit, as well as initial configuration of a replacement control unit with an individual bus address or additional parameters.

48 Claims, 5 Drawing Sheets

(51) Int. Cl.
  *H04L 12/24* (2006.01)
  *G06F 8/658* (2018.01)
  *B65G 13/07* (2006.01)
  *B65G 23/08* (2006.01)
  *B65G 43/10* (2006.01)
  *H04L 12/26* (2006.01)

(52) U.S. Cl.
  CPC ......... *B65G 43/10* (2013.01); *G05B 19/4189* (2013.01); *G06F 8/658* (2018.02); *H04L 41/0668* (2013.01); *H04L 61/2038* (2013.01); *H04L 43/10* (2013.01)

(58) Field of Classification Search
  USPC ........................................................ 700/28
  See application file for complete search history.

(56) References Cited

U.S. PATENT DOCUMENTS

| | | |
|---|---|---|
| 5,485,590 A | 1/1996 | Hyatt et al. |
| 5,530,643 A | 6/1996 | Hodorowski |
| 6,117,318 A | 9/2000 | Simonelli |
| 6,124,656 A | 9/2000 | Jensen |
| 6,200,036 B1 | 3/2001 | Girardey |
| 6,240,335 B1 | 5/2001 | Wehrung et al. |
| 6,633,278 B1 | 10/2003 | Hoegener et al. |
| 6,672,449 B2 | 1/2004 | Nakamura et al. |
| 6,701,214 B1 | 3/2004 | Wielebski et al. |
| 7,207,433 B2 | 4/2007 | Schaefer |
| 8,006,829 B2 | 8/2011 | Itoh et al. |
| 8,381,901 B2 | 2/2013 | Yamamoto |
| 8,757,363 B2 | 6/2014 | Combs et al. |
| 9,359,142 B2 | 6/2016 | Jepsen |
| 9,618,056 B2 | 4/2017 | Itoh |
| 9,731,900 B2 | 8/2017 | Ruggeri |
| 2002/0010527 A1 | 1/2002 | Wielebski et al. |
| 2003/0168316 A1 | 9/2003 | Knepple et al. |
| 2004/0144623 A1 | 7/2004 | Newsom et al. |
| 2005/0083188 A1 | 4/2005 | Choi |
| 2006/0293782 A1 | 12/2006 | Rees |
| 2007/0179072 A1 | 8/2007 | Hvidberg et al. |
| 2008/0270427 A1 | 10/2008 | Franke et al. |
| 2010/0322473 A1 | 12/2010 | Taylor et al. |
| 2012/0024669 A1 | 2/2012 | Danelski et al. |
| 2012/0175223 A1 | 7/2012 | Breen et al. |
| 2012/0175225 A1 | 7/2012 | Breen et al. |
| 2012/0211330 A1 | 8/2012 | Ziegler |
| 2012/0259436 A1 | 10/2012 | Resurreccion et al. |
| 2012/0290126 A1 | 11/2012 | Combs et al. |
| 2013/0134017 A1 | 5/2013 | Hall et al. |
| 2013/0190915 A1 | 7/2013 | Choo et al. |
| 2013/0211546 A1 | 8/2013 | Lawson et al. |
| 2014/0156063 A1 | 6/2014 | Neiser et al. |
| 2014/0277698 A1 | 9/2014 | Combs et al. |
| 2014/0326582 A1 | 11/2014 | Sakaguchi |
| 2015/0068874 A1 | 3/2015 | Jepsen et al. |
| 2015/0151921 A1 | 6/2015 | Collot |
| 2016/0080526 A1 | 3/2016 | Meyer-Graefe |
| 2016/0318714 A1 | 11/2016 | Reischl |
| 2018/0009607 A1 | 1/2018 | Tiedemann |

FOREIGN PATENT DOCUMENTS

| | | |
|---|---|---|
| CN | 2033808 U | 3/1989 |
| CN | 2199164 Y | 5/1995 |
| CN | 203682423 U | 7/2014 |
| DE | 1978258 | 2/1968 |
| DE | 3538173 | 1/1987 |
| DE | 4230729 | 3/1993 |
| DE | 69306884 | 5/1997 |
| DE | 19811130 | 9/1999 |
| DE | 19934514 | 2/2001 |
| DE | 10040438 | 3/2002 |
| DE | 102006004421 | 8/2006 |
| DE | 102006005365 | 8/2007 |
| DE | 102006054575 | 9/2008 |
| DE | 102008053557 | 9/2009 |
| DE | 102008018205 | 12/2009 |
| DE | 202008017534 | 12/2009 |
| DE | 20200902821 | 2/2011 |
| DE | 202009012822 | 2/2011 |
| DE | 202012000793 | 4/2012 |
| DE | 102010044027 | 5/2012 |
| DE | 102011004802 | 8/2012 |
| DE | 102011109531 | 2/2013 |
| DE | 102012205709 | 10/2013 |
| DE | 102013207760 | 10/2014 |
| DE | 102015106026 | 8/2016 |
| DE | 102015104130 | 9/2016 |
| DE | 102015106034 | 10/2016 |
| DE | 102015106024 | 11/2016 |
| DE | 102015107167 | 11/2016 |
| DE | 102015114030 | 3/2017 |
| EP | 1021664 | 1/2002 |
| EP | 1454851 | 9/2004 |
| EP | 1656312 | 5/2006 |
| EP | 1675244 | 6/2006 |
| EP | 1770458 | 4/2007 |
| EP | 1865393 | 12/2007 |
| EP | 1875724 | 1/2008 |
| EP | 2369211 | 9/2011 |
| EP | 2455310 | 5/2012 |
| EP | 32125431 A1 | 9/2017 |
| JP | S5741821 | 3/1982 |
| JP | S5890447 | 5/1983 |
| JP | S59180609 | 10/1984 |
| JP | S6015308 | 1/1985 |
| JP | H05236612 | 9/1993 |
| JP | 2003026603 | 1/2003 |
| JP | 2003104534 | 4/2003 |
| JP | 2004098554 | 4/2004 |
| JP | 2014516895 | 7/2014 |
| JP | 2014142740 | 8/2014 |
| WO | 0203153 | 1/2002 |
| WO | 02098768 | 5/2002 |
| WO | 2010142029 | 12/2010 |
| WO | 2011029120 | 3/2011 |
| WO | 2012094690 | 7/2012 |
| WO | 2012113922 | 8/2012 |
| WO | 2012154650 | 11/2012 |
| WO | 2013000006 | 1/2013 |
| WO | 2013000006 A2 | 1/2013 |
| WO | 2014011459 | 1/2014 |
| WO | 2014057984 | 4/2014 |
| WO | 2016066495 A1 | 5/2016 |
| WO | 2016169982 | 10/2016 |
| WO | 2016169986 | 10/2016 |
| WO | 2016177906 | 10/2016 |
| WO | 2014178399 | 2/2017 |
| WO | 2018009607 A1 | 1/2018 |

METHOD FOR REPLACING A CONTROL UNIT IN A CONVEYING DEVICE

CROSS-REFERENCE TO FOREIGN PRIORITY APPLICATION

The present application claims the benefit under 35 U.S.C. § 119(b) of PCT/EP2016/058765 filed Apr. 20, 2016, which claims priority to German Application No. 102015106026.4 filed Apr. 20, 2015, entitled "Method for Replacing a Control Unit in a Conveying Device."

FIELD OF THE INVENTION

The invention relates to a method for replacing a defective control unit in a conveying device interconnected by a bus, said conveying device comprising a first control unit having a first bus address and a second control unit having a second bus address, wherein the first control unit controls a first conveyor segment and the second control unit controls a second conveyor segment, and the first control unit and the second control unit are interconnected via bus communication.

BACKGROUND OF THE INVENTION

Conveying devices of this kind are used in logistics processes for fully automated and semi-automated conveying of articles, and convey, for example, parcels, pallets, merchandise and other goods from an entry point to a exit point. In complex conveyor systems, the entry points and the exit points are sometimes far apart. They are connected to each other by conveyor segments. A conveyor segment may form a section of a conveyor line, which includes a conveyor drive that can be controlled by the control unit and, if necessary, a sensor for detecting a product being transported in the conveyor segment. A conveyor segment can also be formed by branching, by merging, by an elevator or a lowerator, by a sorter or a singulator, and these devices' own actuators and sensors can be controlled and monitored by the respective control unit of the conveyor segment. The conveyor segments form the architecture of a conveyor system. They allow complex conveying devices to be implemented.

The control units monitor and control one or more of these conveyor segments. The conveying process within the conveyor segments is monitored and influenced with the aid of suitable sensors and actuators. Depending on requirements, suitable sensors must detect the spatial position, size, and identification, including the parameters of control elements and the articles being conveyed. Typical sensors used in this connection include photoelectric barriers, photoelectric sensors, optical scanners, and proximity switches. The articles are moved, braked, and changed in their orientation or direction by means of the actuators. Examples of typical actuators include pneumatic or hydraulic cylinders, stepper motors, roller drives, belt drives, and vibration drives, inter alia.

A conveyor segment may usually include a zone sensor, a plurality of conveyor rollers and at least one conveyor drive. A zone sensor is a photoelectric barrier, a photoelectric sensor, an optical scanner or a proximity switch, for example. A conveyor drive is a motorised roller, a drum motor, or a geared motor with a coupling element, for example. Conveyor rollers, motorised rollers and drum motors are usually mounted in a frame and move the article being transported by contact with the driven rollers.

A control unit controls the conveying process, for example, the activity status of the conveyor drive and its direction of rotation. Control units of conveyor segments generally have an interface as well, via which it is possible for control commands to be received from a central control unit or from neighbouring control units of neighbouring conveyor segments. These interfaces are mostly digital and are based on standardised communication buses such as EtherCAT, Ethernet/IP, Profibus and ASi, thus allowing bus communication between or to the individual control units of the conveyor segments. By using conveying devices interconnected by a bus, it is possible for controlling activities to be decentralised. The advantageous aspect of this is that basic functions can be stored in a control unit, thus simplifying the installation, setting up, and servicing of conveying devices.

Control units for conveying devices are basically known from the prior art. Aspects of a control unit in a conveyor line controller are described in U.S. Pat. No. 8,757,363 B2. Different operating modes for conveying articles are described, as are methods for setting up conveyor devices. EP 1 454 851 B1 describes a method that is implemented in a control unit and which, jointly with other control units, controls roller conveyors of several conveying zones in a described procedure for influencing the flow of articles.

It is necessary in conveying devices to minimise the downtimes of the conveyor device and the commercial losses this downtime involves. Downtimes result, for example, from malfunctions in the flow of products or from malfunctions or wear and tear of the mechanical parts of the conveying device. Malfunctions may also result from defects in electronic components, such as the control unit. Whereas disruptions in the flow of articles, such as jamming of articles, can mostly be remedied quickly by a user manually intervening, eliminating malfunctions of the mechanical components of a conveying device is more time-consuming in most cases. It is possible to guard against such component failure by defining service intervals and performing routine checks. Defining service intervals is uncommon in the case of electronic components, because component failure cannot normally be foreseen or identified from visible signs of wear and tear. For that reason, failure of electronic components is predominantly acute. Sensitive electronic components can also be damaged or destroyed by departure from the electric input parameters or by mechanical impacts, for example by collisions with vehicles or workpieces.

Defects in electronic components are mostly irreparable and require complete replacement of the components or of complete modules. For example, it is impracticable, in the environment of a conveying device, to replace single electronic components or electronic modules of a control unit, in the form of printed circuit boards. Instead, a defective control unit of a conveying device is replaced by a control unit that works. Some present-day control units are technically designed in such a way, to simplify replacing a control unit, that only a few electrical connections need to be made. Nevertheless, replacing a control unit usually requires skilled personnel to configure and integrate the replacement control unit within the system. This can result in significant downtimes of the conveying device and associated commercial losses.

SUMMARY OF THE INVENTION

A method for replacing and configuring a control unit is described in U.S. Pat. No. 8,757,363 B2, in which a replacement control unit automatically sends a configuration message to other control units in the conveying device, which results in initial configuration of the replacement control unit being carried out using a backup copy of the configuration of the defective control unit. However, the disadvantage of this method is that a defective control unit can cause substantial damage to the articles being transported. There is also a risk of such defects causing congestion of the articles, which means that concomitant damage may be caused to other components of the conveyor system.

One requirement to be met nowadays by a conveying device is that the risk of damage to components of the conveying device be minimised and that downtimes be reduced.

This objective is achieved, according to the invention, by a method of the kind initially specified, the method comprising the following steps:

(i) detecting the defect in the second control unit by means of the first control unit, (ii) switching the first control unit into a configuration mode when the first control unit detects a defect in the second control unit, (iii) integrating a third control unit into the bus communication after the first control unit has been put into the configuration mode (iv) transferring an individual bus address from the first control unit to the third control unit, (v) storing the individual bus address transferred from the first control unit in the third control unit.

A control unit should be understood to be an electronic circuit which is able to control and monitor at least one conveyor segment. It is advantageous if several conveyor segments, for example, four conveyor segments, can be monitored and controlled by one control unit. A configuration mode should be understood, furthermore, to be a mode in which one control unit can configure another control unit via bus communication.

The method according to the invention allows detection of a defect in a control unit as well as configuration of a replacement control unit. According to the method of the invention, a defect in a second control unit is detected in a first step by a first control unit, in response to which the first control unit switches into a configuration mode. This detection of a defect may be based, for example, on a control response pattern of the second conveyor segment, by comparing that pattern with a specified pattern. The purpose of the configuration mode is to allow an unconfigured third control unit to be automatically assigned an individual bus address. An unconfigured control unit is understood to be a control unit in which at least some of and, in particular, all the individual parameters required for monitoring and controlling a conveyor segment have not yet been configured. It is preferred that the first control unit continues to exercise control over the first conveyor segment, despite switching into the configuration mode. In particular, the configuration mode may be operated in the first control unit concurrently with its actual controlling activities, and the first control unit can stop articles being conveyed, register as "busy" the second conveyor segment that has been detected as defective, or can carry out pre-programmed measures in order to relieve the congestion. This allows the conveying process to be stopped immediately in the event of a defect, and subsequent damage to be prevented.

If a control unit is in a configuration mode, it is preferred that the control unit can transmit a configuration request, which can take the form of a digit sequence, a command, a bus data packet or a token and which can be received by all the control units integrated in the bus communication. The bus communication can be wired bus communication, for example an EtherCAT, Ethernet/IP or Profinet bus. Bus communication can also be understood to be wireless, radio-based bus communications, such as WirelessHART, Wireless-IO, Wireless-Profinet, ZigBee or Bluetooth, or communication buses based on the IEEE 802.11 standard. The network topology may take the form of a bus, ring, star or mesh topology, for example. Integration of a control unit can be understood as electric coupling to bus lines, for example using insulation displacement contacts, plug connectors or capacitive coupling, or also as integration within a network, for example by sending a hardware address to other participants integrated into the communication bus, or by logging into a network server.

According to the invention, the transmitted configuration request is preferably processed by an unconfigured control unit. Control units that already have a configuration preferably do not process that configuration request. It may also be preferred that the transmission of the configuration request by the first control unit is repeated in a predetermined manner.

If a third control unit is integrated into the bus communication, the first control unit, which is in configuration mode, transmits to the third control unit a configuration request that specifically includes the individual bus address of the second control unit that has been detected as defective. The third control unit stores and adopts the individual bus address that is received, as a result of which the third control unit can be addressed via bus communication.

According to the invention, the individual bus address can be assigned automatically by the first control unit as soon as the third control unit has been integrated into the bus communication. This is particularly advantageous because there is no need for programming to be carried out by a user, and because the individual bus address of the third control unit is automatically configured. This saves time, simplifies the replacement process, and allows replacement to be carried out without service personnel.

The method may be developed such that the second control unit sends an activity signal via the bus lines and the first control unit receives the activity signal from the second control unit and the defect in the second control unit is detected in step (i) by the first control unit failing to receive the activity signal from the second control unit, in particular, in that the second control unit sends an activity signal at regular, predetermined intervals and a defective control unit is detected by the failure to receive the activity signal within the predetermined interval after receiving a preceding activity signal.

An activity signal is understood to be a signal which the second control unit sends to the first control unit. An activity signal may be conceived of as an electrical signal, a sequence of numbers, a command, a bus data packet, or a token. An activity signal is sent by a control unit during normal operation. The activity signal is preferably sent at predetermined intervals. This allows the proper functioning of the second control unit to be checked at predetermined intervals. It may likewise be preferred that the activity signal is sent as part of a self-test when the conveying device is first commissioned or each time the conveying device is started up. If the first control unit does not receive an activity signal from the second control unit, the second control unit is identified as defective by the first control unit. More specifically, an activity signal should be received within a first interval in order to confirm that the second control unit is working properly. If the first interval times out, the second control unit can be considered defective. To prevent incorrect detection, it may also be preferred that, when the activity signal is systematically transmitted irregularly by the second control unit, a defect in the second control unit is not inferred until transmission and/or reception of the activity signal has failed several times to occur. The reason for systematically transmitting or receiving the activity signal in an irregular manner may be, for example, that the first or second control unit is fully occupied with control processes or that bus communication is busy with the transmission of data from other control units and that transmission has to be carried out at a later time.

According to another preferred embodiment, the first control unit is put into the configuration mode by the failure to receive the activity signal.

This embodiment allows a control unit to detect a partial defect automatically in a self-test and to inform the first control unit integrated into the bus communication about the self-detected defect. A partial defect can be understood to be a missing or incomplete bus address, a defect in the electronics of the control unit, or incomplete or inconsistent configuration. This embodiment can be advantageous because failures of the conveyor system can be prevented by the automatically triggered configuration of the second control unit by the first control unit. In particular, this embodiment does not require any manual intervention by the service personnel.

According to another preferred embodiment, an error message is generated by the first control unit and transmitted via bus communication if the activity signal is not received in the first control unit.

An error message should be understood to be a sequence of numbers, a command, a bus data packet, or a token. This error message, which is preferably sent to all the control units included in bus communication, can be used to carry out preconfigured measures for the entire conveying device in the event of a defect in a control unit. For example, the control units of the conveying device may be prompted by the error message to stop all the conveyor segments so as to prevent conveyed articles from piling up and thus to prevent damage being caused to the articles being conveyed. The error message can trigger an acoustic, optical, or digital signal at the defective control unit or at both its neighbouring control units, in order to locate them quickly. An error message may also be received in a control room and inform the control room personnel about the defect in a control unit. The control room personnel can then arrange immediately for a control unit to be replaced, thus reducing the downtimes of the conveying device.

It is also preferred that the third control unit transmits a presence signal after being integrated into the bus communication, and that the first control unit is put into the configuration mode by receiving the presence signal from the third control unit. A presence signal is understood here to be a signal which is transmitted whenever an unconfigured control unit is integrated into the bus communication. This presence signal may be conceived of as a sequence of numbers, a command, a bus data packet, or a token. As an addition to the activity signal, the presence signal allows the configuration mode of the first control unit to be activated. This embodiment allows the first control unit to recognise the third control unit as unconfigured as soon as the third control unit is integrated into the bus communication and actively puts the first control unit into a configuration mode in order to be assigned a bus address.

It is also preferred that the third control unit is integrated, wherein the second control unit is removed or the second control unit remains. According to the invention, it is irrelevant whether the defective control unit remains in the conveyor segment or whether it is removed. What this also means, in particular, is that the order of replacement is not stipulated. It may be preferred that a third control unit is integrated into the conveying device in a first step in order to minimise the downtime of the conveying device. The defective second control unit can then be removed from the conveying device during operation of the latter or it can remain in place.

It is also preferred that in step (v), the third control unit stores the individual bus address only if the third control unit receives a message from the first control unit containing the first bus address of the first control unit and an individual bus address to be allocated to the third control unit. This may be advantageous when several control units in a conveying device are simultaneously in a defective state. According to the invention, several control units can be put into a configuration mode and transmit a configuration request via bus communication. To prevent any unallowed configuration, it is, therefore, preferred that the number and the message of configuration requests are checked in an unconfigured control unit.

It is further preferred that a third conveyor segment comprises a fourth control unit having a fourth bus address and the third control unit stores the individual bus address in step (v) only if the third control unit receives two messages, wherein the first message has been sent from the first control unit and contains the first bus address of the first control unit to be allocated to the third control unit, and the second message has been sent from the fourth control unit and contains the fourth bus address of the fourth control unit and the bus address to be allocated to the third control unit and the individual bus address to be allocated to the third control unit is identical in both messages.

This may be advantageous when several control units in a conveying device are simultaneously in a defective state. According to the invention, several control units can be put into a configuration mode and transmit a configuration request via bus communication. To prevent any unallowed configuration, it is, therefore, preferred that the number and the message of configuration requests are checked in an unconfigured control unit.

It is also preferred that the second bus address of the second control unit has been stored in the first control unit in a previous backup step, and the first bus address of the first control unit has preferably been stored in the second control unit, in particular, that the bus addresses of neighbouring control units have been stored reciprocally, and the third control unit is configured by means of the stored bus address from the second control unit in the following steps:

(a) transmitting the stored second bus address of the second control unit to the third control unit and said bus address being received by the third control unit, (b) storing in the third control unit the second bus address of the second control unit received by the third control unit, (c) storing the first bus address of the first control unit in the third control unit.

According to this embodiment, it is possible, despite a defect in the second control unit, to restore the original bus address of the second control unit and to transfer it to a third control unit. Due to the original bus address of the second control unit being assigned, the third control unit can be addressed via bus communication and can receive control commands.

In the previous backup step, the second bus address of the second control unit, at least, is stored outside the second control unit, so a backup copy of the bus address is created. This backup copy is preferably stored in a neighbouring control unit. This backup step may be carried out, for example, during initial installation of the conveying device, when starting up the conveying device, at the instigation of a user, or may be automatically instigated by the control units. This backup step guards against any loss of the bus address of a configured control unit as a result of the defect in a control unit. It is particularly preferred that bus addresses of neighbouring control units are reciprocally stored, with the result that at least one backup copy of the bus address exists. The redundant information produced as a result can be used in the event of a defective control unit to restore the lost bus address of the defective control unit. This reconstruction is achieved by transferring the stored bus address into the third control unit via bus communication. The first control unit is preferably in a configuration mode in which the first control unit transmits configuration requests to a third control unit via bus communication. The third control unit should preferably be provided with a basic configuration so that the third control unit can receive and process information via bus communication. After it has stored the bus address, the third control unit can be addressed using the bus address and further configuration can be carried out, if necessary. Commands can also be sent to the third control unit and control exercised over that conveyor segment. According to this embodiment, it is possible for a bus address to be assigned automatically to the third control unit. This is particularly advantageous because this embodiment does without any intervention by a user and avoids any manual configuration of a control unit. This automatic procedure also prevents any incorrect configurations of the kind that might be caused inadvertently by a user. A defective control unit can thus be replaced in a time-saving manner, and the likelihood of misconfiguration can be reduced.

It is also preferred that a configuration of the second control unit has been stored in the first control unit in a previous backup step, and preferably that a configuration of the first control unit has been stored in the second control unit, in particular, that the configurations of the neighbouring control units have been stored reciprocally, and that the third control unit is configured by means of a stored configuration of the second control unit.

A configuration should be understood here to be the parameters that are required for operating the conveyor segment. These include, for example, the directions of rotation of the conveyor drives, the conveying speeds, and the conveying modes.

In the previous backup step, the configuration of the second control unit, at least, is stored outside the second control unit, so a backup copy of the configuration is created. This backup copy is preferably stored in a neighbouring control unit. This backup step may be carried out, for example, during initial installation of the conveying device, when starting up the conveying device, at the instigation of a user, or may be automatically instigated by the control units. This backup step guards against any loss of the configuration of a configured control unit. It is particularly preferred that configurations of neighbouring control units are reciprocally stored, with the result that at least one backup copy of a configuration exists. The redundant information produced as a result can be used in the event of a defective second control unit to reconstruct the lost configuration of the defective control unit in a third control unit, thus providing a functional replacement for the second control unit. This reconstruction may preferably be achieved by transferring the stored configuration address into the third control unit via bus communication.

The first control unit is preferably in a configuration mode in which the first control unit sends configuration requests to the third control unit via bus communication. The third control unit should preferably be provided with a basic configuration so that the third control unit can receive and process information via bus communication.

According to this embodiment, it is possible for a bus address to be assigned automatically to the third control unit. This is particularly advantageous, because this embodiment does without any intervention by a user and avoids any manual configuration of a control unit. This automatic procedure also prevents any incorrect configurations of the kind that might be caused inadvertently by a user. A defective control unit can thus be replaced in a time-saving manner, and the likelihood of misconfiguration can be reduced.

It is also preferred that the bus address or, in addition, a configuration of the second control unit, has been stored in a previous backup step in a control unit of a conveyor segment that is not immediately adjacent, and, reciprocally, that the bus address or, in addition, a configuration of the control unit which is not immediately adjacent, has preferably been stored in the second control unit.

A conveying device may consist of many control units that can exchange data via bus communication. It may, therefore, be preferable that the bus address or, in addition, the configuration of a control unit is stored in a control unit that is further away. This is always advantageous whenever the immediately adjacent control units suffer a defect simultaneously. Simultaneous destruction of neighbouring control units may be caused mechanically, for example, by a workpiece or a vehicle, or be due to electric parameters being exceeded on the power supply line or on a wired bus communication. Storing the bus address or, in addition, a configuration in a control unit that is located some distance away reduces the likelihood of losing this information.

It is also preferred that the bus address or, in addition, a configuration of the second control unit, has been stored in a previous backup step in a plurality of control units, and the bus addresses or the configurations of the plurality of control units, have preferably been stored reciprocally in the second control unit. This is always advantageous whenever the immediately adjacent control units suffer a defect simultaneously. Simultaneous destruction of neighbouring control units may be caused mechanically, for example, by a workpiece or a vehicle, or be due to electric parameters being exceeded on the power supply line or on a wired bus communication. By storing the bus address or, in addition, a configuration in a plurality of control units, the likelihood of losing this information is reduced. It is preferred, in particular, that this plurality of control units are not immediately adjacent to each other, but are assigned to conveyor segments that are spaced apart from each other along the conveying device. This means that the backed up bus addresses or, in addition, die configurations, are spatially distributed, thus providing a redundancy of information which reduces the likelihood of this information being lost.

It is also preferred that, in a previous backup step, the second bus address of the second control unit or, additionally, the configuration of the second control unit, has been stored in a backup unit, or has been stored in a programmable logic controller, or has been stored on a web server, in particular in that the individual bus addresses or, additionally, the configurations of all the control units integrated in the bus communication have been centrally stored in one unit.

Storing bus addresses and configurations of control units in a central unit can be advantageous because all the bus addresses and configurations of the control units in the conveying device are stored in one unit. It is possible, as a result, to retrieve a bus address or configuration of a control unit selectively and from a central location. For example, a specialised backup unit that is designed to automatically store bus addresses and configurations of the control unit integrated into the bus communication can, thus, be integrated into that bus communication. In another variant, the bus addresses and configurations of the control units can be stored in a programmable logic control. This can be advantageous, because many conveying devices have programmable logic controllers and are already integrated in the bus communication of a conveying device. In many cases, programmable logic controllers also have sufficient storage capacity to store a large number of bus addresses or, in addition, the configurations of control units.

In another embodiment, it is preferred that the bus addresses and configurations are stored on a web server and can thus be retrieved from a central location via various web server interfaces. By means of a web server, information about the bus addresses and configurations of the control units can be retrieved on terminals or mobile devices that have network access, and access to such information can be provided independently of operating systems and application programs.

It is also preferred that configuration includes the full operating software of a control unit.

Operating software should be understood here to mean software which is executed inside a control unit and which implements functions of the control unit. Such operating software, of the kind that is integrated in devices or systems, may be available in different versions as a result of further development and bug fixing. There is also a possibility of different versions of an operating software being incompatible with a control unit. In such a case, the method according to the invention can be applied advantageously, because it is able to configure an unconfigured control unit with operating software that was previously used within the conveying device. It is possible, in particular, to dispense with installing a specific version of the operating software on the third control unit. In this way, it is possible to ensure that the operating software of the third control unit is compatible with the first control unit. This reduces the number of different variants of control units that have to be kept available as replacements, which can simplify the procurement and storage of replacements, as well as the actual replacement of defective control units.

Another requirement to be met by a conveying device nowadays is that the configuration of a conveying device can be replaced in as time-saving a manner as possible.

This object is achieved by a method comprising the following steps:

(i) detecting a defect in the second control unit by means of the first control unit, (ii) switching the first control unit into a configuration mode when the first control unit detects a defect in the second control unit, (iii) integrating a third control unit into the bus communication after the first control unit has been put in configuration mode, (iv) transferring a configuration from the first control unit to the third control unit or from the third control unit to the first control unit, (v) storing the configuration transferred from the first control unit in the third control unit or storing the configuration transferred from the third control unit in the first control unit.

The method according to the invention allows a configuration to be transferred from the first control unit to the third control unit, in order to provide the third control unit, which may be unconfigured, with a configuration. Similarly, a configuration can be transferred from a possible pre-configured third control unit to the first control unit, in order to provide the first control unit with the configuration of the third control unit. A pre-configured control unit is understood to be a control unit in which at least some of and, in particular, all the individual parameters required for monitoring and controlling a conveyor segment have been configured. In this case, a configuration is transferred via the aforementioned bus communication from one control unit to another control unit. A transferred configuration can then be stored in or removed from the control unit which received the configuration.

According to the invention, a configuration can be transferred automatically by the first or the third control unit as soon as the third control unit has been integrated into the bus communication. This is particularly advantageous, because there is no need for configuration or programming to be carried out by a user, and because the first or third control unit is automatically configured. This saves time, simplifies replacement of a defective control unit, simplifies replacing the configuration of a control unit, and allows replacement to be carried out, including configuration transfer, without any service personnel being required.

The method can be developed such that the configuration includes parts of the operating software of a control unit. It may likewise be advantageous that the operating software is completely replaced, that is, that configuration includes the full operating software of a control unit. Operating software is often modular nowadays and is improved by updates, for example, by fixing programming errors or by adding additional functions to operating software. This means, for example, that despite intensive testing and validation programming errors that are not discovered until a conveyor system is actually in operation can be remedied by replacing part of the operating software.

Replacing part of an operating software may also be necessitated by modifications to the conveyor system, for example, when merges, diverts, or elevators are integrated into an existing conveyor system. Software modules, program files, or parameter data sets that perform certain functions using software technology and that modify or extend the way in which a conveying device is controlled in order to meet requirements are then added to the operating software. By partly replacing operating software, parts of the operating software that have already been configured and which are fully functional are left untouched while new functions are added. Given that many control systems nowadays use complete operating systems, such as Linux distributions, which have many software components specific to the operating system and only a limited number of software components relating to applications, replacing parts of operating software is common practice in such cases also.

A part of operating software should also be understood to mean one or more data sets with configuration parameters for a conveying device. A part of operating software should also be understood as any data and information which has been obtained and stored during operation of a conveying device. Examples include counter statuses, information regarding maintenance work, warnings arising during operation, or error messages.

It is also preferred that the configuration includes a unique version identifier, by means of which the up-to-dateness of the configuration can be determined, in particular that it includes a unique version identifier which is allocated to an individual firmware version or software version of the operating software of a control unit.

A version identifier should be understood to be an identifier which allows two or more configurations to be distinguished from each other, or to be established as identical. A version identifier may consist of an alphanumeric string, which can also include special characters. In particular, a version identifier can also be understood as a version number, of the kind that is well-known in software development as a way of distinguishing between different development statuses of software. Such a version number is normally subdivided into different parts and includes, for example, a main version number, a revision number or a build number. The version identifier can also be a date expressed in one of the common date formats.

When a configuration has a unique version identifier, this is advantageous for the specific reason that the configurations of control units are subject to continuous development, as a result of which they change the way they operate and the range of functions they can perform. Different configurations are sometimes incompatible with each other and result in control units malfunctioning. To prevent this from happening, it is necessary that the development status of a configuration can be tracked, and this is made possible with a version identifier. Giving a configuration a unique version identifier allows the respective development status of a control software configuration to be uniquely identified and also to be compared with the development status of a configuration of a different control unit. Potential incompatibilities between one configuration and control units or configurations of other control units can thus be identified at an early stage.

It is preferred that step (v) is carried out as follows:

(v) comparing the version identifier of the configuration of the first control unit with the version identifier of the configuration of the third control unit, preferably in the first or the third control unit, (vi) if the version identifier of the first control unit is more up-to-date that the version identifier of the third control unit, then storing the configuration transferred from the first control unit, or if the version identifier of the first control unit is more up-to-date than the version identifier of the third control unit, then (a) transferring the configuration of the first control unit to the third control unit and (b) storing the transferred configuration of the first control unit in the third control unit.

According to this embodiment, the third control unit newly integrated into the bus communication is provided with the configuration of the first control unit if the version identifier of the configuration of the third control unit is older than that of the configuration of the first control unit. A replacement control unit thus receives a configuration whose version identifier has at least the same status as that of first control unit. If the configuration of the third control unit is more up-to-date than the configuration of the first control unit, no configuration is stored in the third control unit. The transferred configuration may be stored in a special area of memory in the third control unit, or the existing configuration of the third control unit can be overwritten.

In the aforementioned method, the version identifiers of the configurations are compared in the first or third control unit. A comparison may also be carried out by a central unit, for example, by a server or by a programmable logic control. Transferring and storing configurations can preclude any incompatibilities between different configurations and can ensure compatibility with the first control unit that is already integrated in a conveyor system, since a newly integrated control unit always receives at least the configuration of the first control unit. It is also possible with this method to provide an unconfigured or largely unconfigured control unit with a configuration.

Replacing a control unit can, therefore, be greatly simplified, because the configuration of the newly integrated control unit is of no relevance and is produced by a configuration that already exists in another control unit. Another advantageous aspect of this is that there is no need to deploy service personnel or to keep configurations available, since these can always be transferred from an existing system.

It is preferred that step (v) is carried out as follows:

(v) comparing the version identifier of the configuration of the first control unit with the version identifier of the configuration of the third control unit, preferably in the first or the third control unit, (vi) if the version identifier of the first control unit is more up-to-date than the version identifier of the third control unit, then storing the configuration transferred from the first control unit to the third control unit, otherwise (a) transferring the configuration of the third control unit to the first control unit and (b) storing the transferred configuration of the third control unit in the first control unit or if the version identifier of the third control unit is more up-to-date than the version identifier of the first control unit, then storing the configuration transferred from the third control unit to the first control unit, otherwise (a) transferring the configuration of the first control unit to the third control unit and (b) storing the transferred configuration of the first control unit in the third control unit.

According to this embodiment, it is possible, by comparing the version identifier of the configuration of the first control unit with the version identifier of the configuration of the third control unit, to determine which configuration is more up-to-date and for the more up-to-date configuration to be transferred to and stored in the control unit with the less up-to-date configuration.

The more up-to-date configuration can be stored in a control unit in a special area of memory or the less up-to-date configuration of a control unit can be overwritten.

According to this embodiment, the first or third control unit is always updated to the configuration with the most up-to-date version identifier. The respective configuration that is more up-to-date is transferred via bus communication and is stored in the control unit having the less up-to-date configuration. It is possible in this way to ensure that both control units have the most up-to-date and uniform configuration.

This is advantageous, because there is no need to establish the version identifier of the configurations manually in a complicated process, and replacement of a configuration, which otherwise involves many steps to be carried out by a user, is greatly simplified by this method. It ensures, in particular, that the control units are operated with the most up-to-date configuration, which, in turn, prevents incompatibilities and errors in the control of conveying devices.

It is preferred that step (v) is carried out as follows:

(v) retrieving the state of a configuration direction setting in the first or third control unit by means of the first or third control unit, (vi) if the configuration direction setting has a first state, transferring the configuration of the first control unit to the third control unit and storing the transferred configuration in the third control unit, or if the configuration direction setting has a second state, transferring the configuration of the third control unit to the first control unit and storing the transferred configuration in the first control unit.

A configuration direction setting should be understood as a setting which specifies the direction (more up-to-date, less up-to-date) in which a version identifier of a configuration is changed. A comparison of version identifiers is not required here. It is specified, instead, whether the third control unit is provided with the configuration of the first control unit, or the first control unit is provided with the configuration of the third control unit.

It is also preferred that the configuration stored in the first control unit is transferred in a downstream distribution step from the first or third control unit to a plurality of control units and is stored in said plurality of control units.

A distribution step should be understood to involve transferring a configuration from the first or third control unit to at least one other control unit. Distribution is preferably to all the control units in a conveyor system which are integrated into the bus communication.

It may also be preferred that the transferred configuration is stored in the respective control units and preferably replaces the configuration that is already there. By means of the distribution of the configuration stored in the first or third control unit, it is possible to set up a standardised configuration in complete conveyor systems or just in certain parts of conveyor systems. Since the configuration which is stored in the first or third control unit, as described above, is a configuration having a more up-to-date version identifier or a less up-to-date version identifier, it is possible in this way to configure a large number of control units in a conveyor system with a more up-to-date configuration (upgrade, update) or with a less up-to-date configuration (downgrade). This method avoids having to install a particular configuration on other or on all the control units of a conveyor system and instead allows fully automatic replacement. For example, by replacing a defective control unit, it is possible to perform an update or a replacement of the configuration of all the control units in a conveyor system simultaneously.

It is also possible in this way for a control unit that does not support certain hardware functions but which is nevertheless to be integrated into a conveyor system, to initiate a downgrade of the configurations of all the control units in a conveyor system and thus ensure that all the configurations of all the control units are compatible with each other.

It is also preferred that step (vi) is carried out as follows:

(v) comparing the version identifier of the configuration of the first control unit with the version identifier of the configuration of the third control unit, preferably in the first or the third control unit, (vi) retrieving the state of a configuration direction setting in the first or third control unit by means of the first or third control unit, (vii) determining the configuration with the more up-to-date version identifier or with the older version identifier, depending on the detected state of the configuration direction setting, (viii) if the configuration with the more up-to-date version identifier is not the configuration of the first or third control unit, (a) transferring the configuration with the more up-to-date version identifier from the first or third control unit to the third or first control unit and (b) storing the transferred configuration of the first or third control unit in the third or first control unit or if the configuration with the older version identifier is not the configuration of the first or third control unit, (a) transferring the configuration with the older version identifier from the first or third control unit to the third or first control unit and (b) storing the transferred configuration of the first or third control unit in the third or first control unit.

A method is thus achieved in which, depending on the identified status of the configuration direction setting, a configuration having a more up-to-date version identifier is transferred to and stored in a control unit having a configuration with a less up-to-date version identifier, or in which a configuration having a less up-to-date version identifier is transferred to a control unit having a configuration with a more up-to-date version identifier.

This allows a choice to be made between setting up the first and third control unit uniformly with the more up-to-date or with the less up-to-date configuration of the first and third control unit. A configuration can be replaced with one having a more up-to-date version identifier (an upgrade), or it is also possible to replace a configuration with one having a less up-to-date version identifier (a downgrade).

It is also preferred that step (vi) of the previous embodiment is carried out as follows:

(a) the first or third control unit retrieves the state of a configuration direction setting in the first or third control unit, (b) the third or first control unit signals, by means of an optical and/or acoustic signal unit, whether the version identifier of the configuration of the third control unit has a more up-to-date or an older or an identical version identifier compared to the version identifier of the configuration of the first control unit, (c) a user changes the state of the configuration direction setting in the first or third control unit, (d) the first or third control unit retrieves the state of a configuration direction setting in the first or third control unit.

This allows a user who does not know the version identifier of the configuration of the third control unit beforehand to be informed whether the configuration in the third control unit is more up-to-date or older than the configuration of the first control unit, or identical to it. This is advantageous because in many cases the configuration of a control unit cannot be readily determined or is unknown.

The comparison can be signalled by means of visual display units, for example by one or more light emitting diodes (LEDs) or lamps on or in the third or first control unit. The result is preferably displayed in the form of a symbol or a plaintext message by a segment display or an liquid crystal (LC) display. It may also be preferred that a user is informed about the up-to-dateness of the configuration of the third control unit by a sequence of sounds generated by an acoustic signal unit, such as a piezoelectric transducer or a loudspeaker.

It is also preferred that the state of the configuration direction setting in the first or third control unit is changed by operating a contact, a switch or a sensor at and/or in a control unit, and/or is changed by a central unit via bus communication.

This may be advantageous in that it is possible for the state of the configuration direction setting to be changed at any time by a user. This can be done at a control unit by means of a switch, such as a dual in-line package (DIP) switch or a stepping switch. It is also possible that this change in state is made by a Reed contact or a Hall sensor, or by an optical sensor, for example, by a light-dependent resistor (LDR) or a phototransistor. In particular, magnetic or optical sensors can be fully encapsulated by a control unit, thus allowing the sensors to be protected against external influences such as dust or dampness. A user can operate contacts, switches, or sensors by means of suitable devices, for example, a screwdriver, a magnet, an electromagnet, or a light source.

It may be advantageous, alternatively, if the state of the configuration direction setting can be changed by a central unit. For example, the state of the configuration direction setting in the first or third control unit can be changed from a control room. This does away with having to physically look for the control unit in question.

According to another aspect of the invention, the problem initially specified is solved by a device, in particular by a conveying device.

The method is realised by a conveying device which comprises a first control unit having a first bus address and at least a second control unit having a second bus address, wherein the first control unit monitors and controls a first conveyor segment and the second control unit monitors and controls a second conveyor segment, the first control unit and the second control unit being interconnected via bus communication, wherein (i) the first control unit is adapted to detect a defect in the second control unit, (ii) the first control unit is adapted to switch into a configuration mode when the first control unit detects the defect in the second control unit, (iii) the first control unit is adapted to be put into a configuration mode, (iv) the first control unit is adapted to transfer an individual bus address from the first control unit to the third control unit, (v) the third control unit is adapted to store the individual bus address transferred from the first control unit.

The conveying device may also be developed such that the second control unit is adapted to send an activity signal via bus communication, the first control unit is adapted to detect a defect in the second control unit on the basis of its not receiving an activity signal from the second control unit, and the first control unit is adapted to detect a defect in the second control unit on the basis of its not receiving an activity signal within a predetermined interval after receiving a preceding activity signal.

The conveying device may also be developed such that the first control unit is adapted to be put into the configuration mode by the failure to receive the activity signal.

The conveying device may also be developed such that the first control unit is adapted such that an error message is generated by the first control unit and transmitted via bus communication if the activity signal is not received in the first control unit.

The conveying device may also be developed such that the third control unit is adapted to transmit a presence signal after it has been integrated into the bus communication, and the first control unit is adapted to be put into the configuration mode by receiving the presence signal from the third control unit.

The conveying device may also be developed such that the second conveyor segment is adapted to integrate the third control unit, wherein the second control unit is removed from the second conveyor segment or the second control unit remains in the second conveyor segment.

The conveying device may also be developed such that the third control unit is adapted to store the individual bus address in step (v) only if the third control unit receives a message from the first control unit containing the first bus address of the first control unit and the second bus address to be allocated to the third control unit.

The conveying device may also be developed such that conveying device includes a third conveyor segment and a fourth control unit having a fourth bus address and the third control unit is adapted to store the individual bus address in step (v) only if the third control unit receives two messages, wherein the first message has been sent from the first control unit and contains the first bus address of the first control unit and the second bus address to be allocated to the third control unit, and the second message has been sent from the fourth control unit and contains the fourth bus address of the fourth control unit and the second bus address to be allocated to the third control unit, and the second bus address to be allocated to the third control unit is identical in both messages.

The conveying device may also be developed such that the first control unit is adapted to store the second bus address of the second control unit in a backup step carried out before step (i), and preferably in that the second control unit is adapted to store the first bus address of the first control unit, and the third control unit is adapted to be configured by means of the stored bus address of the second control unit, wherein the first control unit is adapted to transmit the stored second bus address of the second control unit and the third control unit is adapted to store the received second bus address of the second control unit and the third control unit is adapted to store the bus address of the first control unit.

The conveying device may also be developed such that the first control unit is adapted to store a configuration of the second control unit in a previous backup step and the second control unit is adapted to store a configuration of the first control unit in a previous backup step and the third control unit is adapted to be configured by means of a stored configuration of the second control unit.

The conveying device may also be developed such that a control unit is adapted to store, in a previous backup step, the bus address or, additionally, a configuration of a control unit of a conveyor segment which is not immediately adjacent, and the second control unit is adapted to store the bus address or additionally a configuration of a control unit which is not immediately adjacent.

The conveying device may also be developed such that a control unit is adapted to store, in a previous backup step, the bus address or, additionally, a configuration of the second control unit conveyor segment, in a plurality of control units, and the second control unit is adapted to store the bus address, or additionally a configuration, in a plurality of control units.

The conveying device may also be developed such that a backup unit or a programmable logic control or a web server is adapted to store the second bus address of the second control unit or, additionally, the configuration of the second control unit, in a previous backup step, and is adapted in particular to store in a central location the individual bus addresses or, additionally, the configurations of all the control units integrated into the bus communication.

The conveying device may also be developed such that the configuration includes the full operating software of a control unit.

With regard to the manner of operation, the advantages and the variants of the conveying device according to the invention, reference is made to the method features corresponding to the device features, and to the associated passages in the description above.

The conveying device may also be developed such that the configuration includes parts of the operating software of a control unit.

The conveying device may also be developed such that the configuration includes a unique version identifier, by means of which the development status of the configuration can be determined, in particular, that it includes a unique version identifier that is allocated to an individual firmware version or software version of the operating software of a control unit.

The conveying device may also be developed such that the first and/or third control unit is adapted to compare the version identifier of the configuration.

The conveying device may also be developed such that the first and/or third control unit is adapted to retrieve a state of a configuration direction setting in the first or third control unit, with regard to a first or second state.

The conveying device may also be developed such that the first and/or third control unit is adapted to transfer the configuration stored in the first control to a plurality of control units in a downstream distribution step, and said plurality of control units is adapted to store the transferred configuration.

The conveying device may also be developed such that the first and/or third control unit is adapted to determine the configuration having the more up-to-date version identifier or having the older version identifier.

The conveying device may also be developed such that the first and/or third control unit is adapted to change the state of the configuration direction setting in the first or third control unit by operating a contact, a switch, or a sensor at and/or in a control unit, and/or to change it by means of a central unit via bus communication.

The conveying device may also be developed such that the first and/or third control unit is adapted to signal, by means of an optical and/or acoustic signal unit, whether the version identifier of the configuration of the third control unit has a more up-to-date or an older or an identical version identifier compared to the version identifier of the configuration of the first control unit.

BRIEF DESCRIPTION OF THE DRAWINGS

A preferred embodiment shall now be described with reference to the attached Figures, in which.

DETAILED DESCRIPTION OF THE PREFERRED EMBODIMENTS

Figure 1A:
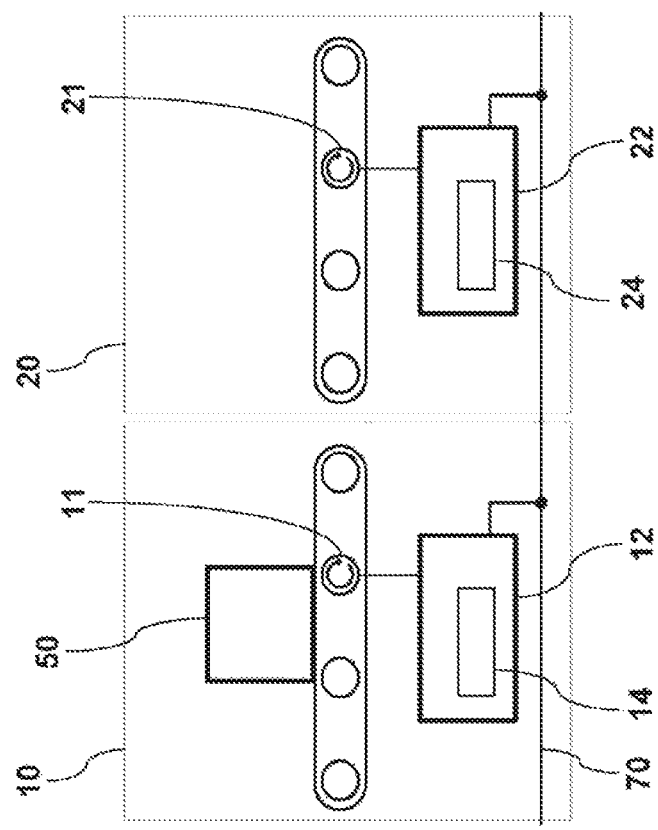
FIG. 1a is a schematic view of a conveying device consisting of a first and a second conveyor segment having a first and a second control unit.

As referenced in the Figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

FIG. 1a shows a conveying device which is composed of two conveyor segments 10, 20. Each conveyor segment 10, 20 has a motorised conveyor roller 11, 21 which drives, via belt drives, the idle rollers that are arranged on either side of the motorised conveyor roller 11, 21. By this means, an article 50 can be conveyed over conveyor segments by lying on the idle rollers and the motorised conveyor roller 11, 21. A control unit 12, 22 is also assigned to each conveyor segment 10, 20. This control unit 12, 22 controls the motorised conveyor roller 11, 21 of a conveyor segment 10, 20. A control unit 12, 22 activates or deactivates the motorised conveyor roller 11, 21 or can reverse the direction of rotation of the conveyor roller.

Control unit 12, 22 is also integrated into bus communication 70. By means of bus communication 70, it is possible for data to be transmitted between control units 12 and 22. An individual bus address 14, 24 is also assigned to each control unit 12, 22, respectively. This individual bus address 14, 24 is stored in a data store in control unit 12, 22.

Figure 2:
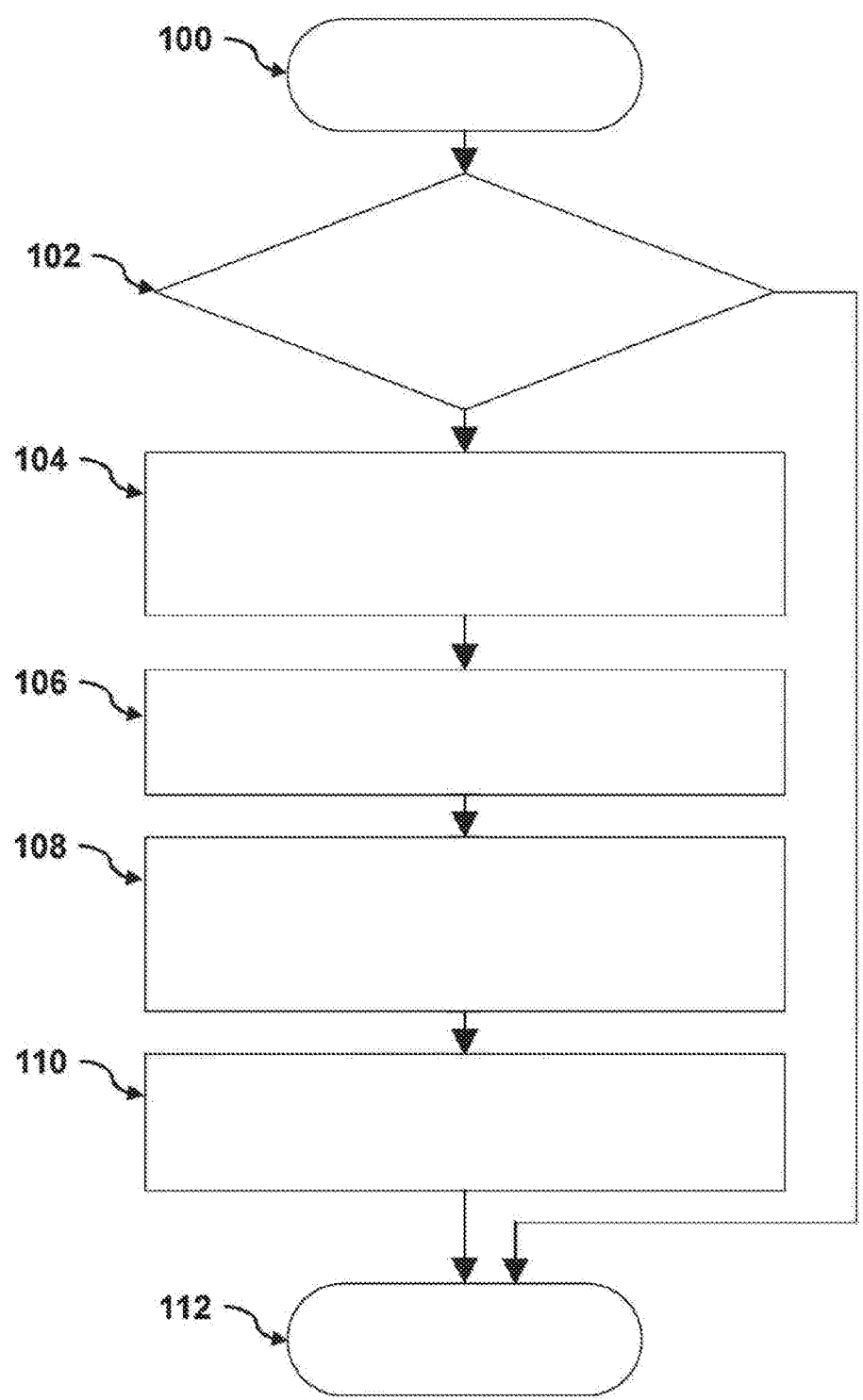
FIG. 2 is a flow diagram of the method according to the invention for replacing a control unit.

In the event of a failure in second control unit 22 due to a defect, the method of the invention for replacing a control unit, as shown in the form of flow diagram in FIG. 2, is to be applied advantageously.

Figure 1B:
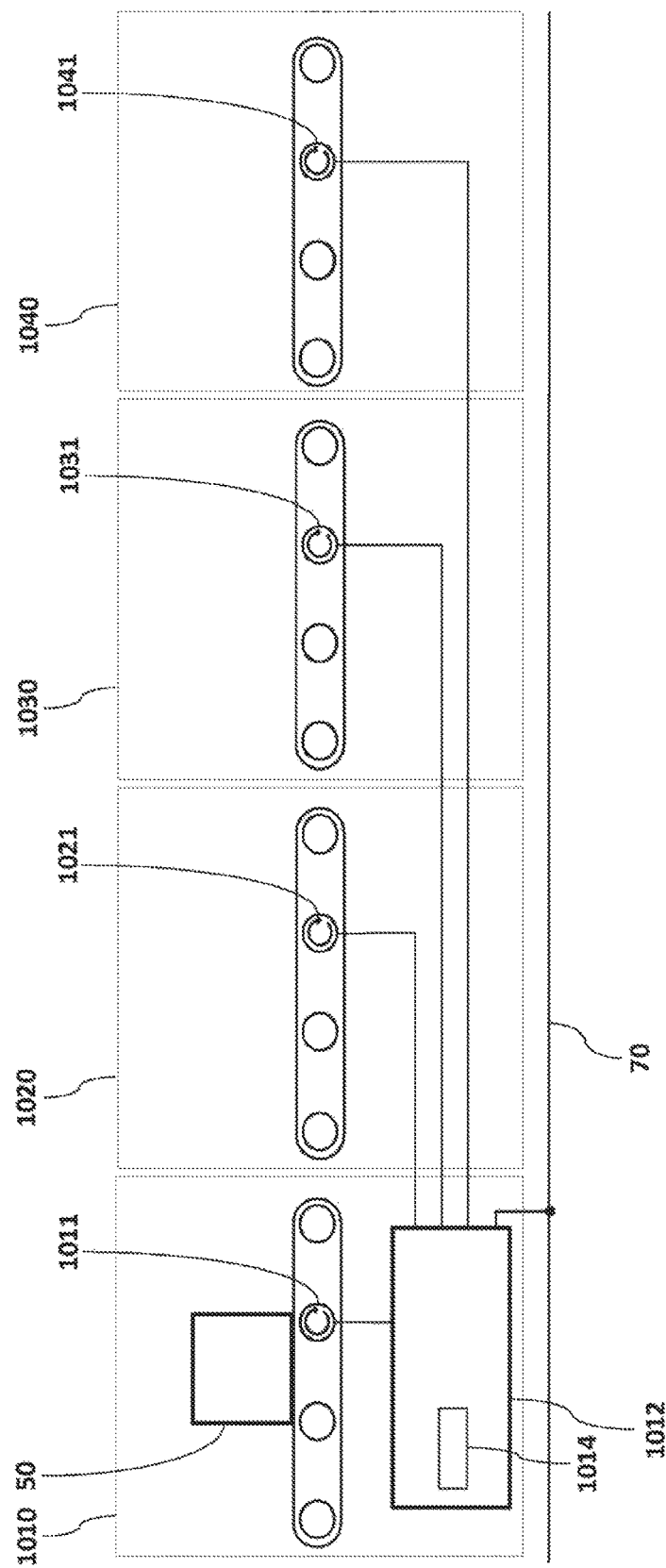
FIG. 1b is a schematic view of a conveying device consisting of four conveyor segments which are monitored and controlled by a control unit.

FIG. 1b shows a conveying device representing another preferred embodiment, in which four conveyor segments 1010, 1020, 1030, and 1040 are monitored and controlled by one control unit. Each conveyor segment 1010, 1020, 1030, 1040 has a motorised conveyor roller 1011, 1021, 1031, and 1041 that conveys article 50 over the conveyor segments. The four conveyor segments 1010, 1020, 1030, 1040 are monitored and controlled by control unit 1012. This control unit 1012 controls the motorised conveyor rollers 1011, 1021, 1031, 1041 of conveyor segments 1010, 1020, 1030, 1040. The control unit 1012 activates or deactivates the motorised conveyor rollers 1011, 1021, 1031, 1041 or can reverse the directions of rotation of the conveyor rollers.

Control unit 1012 is also integrated into bus communication 70. By means of bus communication 70, it is possible for data to be transmitted to other control units (not shown). An individual bus address 1014 is assigned to control unit 1012 for addressing purposes. This individual bus address 1014 is stored in a data store in control unit 1012.

FIG. 2 shows, by way of example, a flow diagram for the inventive method, in the form of flow diagram 100.

The method begins with step 100, followed by test step 102, in which the first control unit checks whether the second control unit is defective. If no defect in the second control unit is detected, the method ends in step 112. If a defect in the second control unit is detected, step 104 is carried out, in which the first control unit switches to a configuration mode. In this configuration mode, an individual bus address is transmitted at predetermined intervals via bus communication. In the following step 106, a third control unit is integrated into the bus communication. In step 108 that follows, the third control unit receives the individual bus address that is transmitted repeatedly by the first control unit. After the individual bus address has been received, it is stored in the control unit in step 110, and the method ends with step 112.

Figure 3:
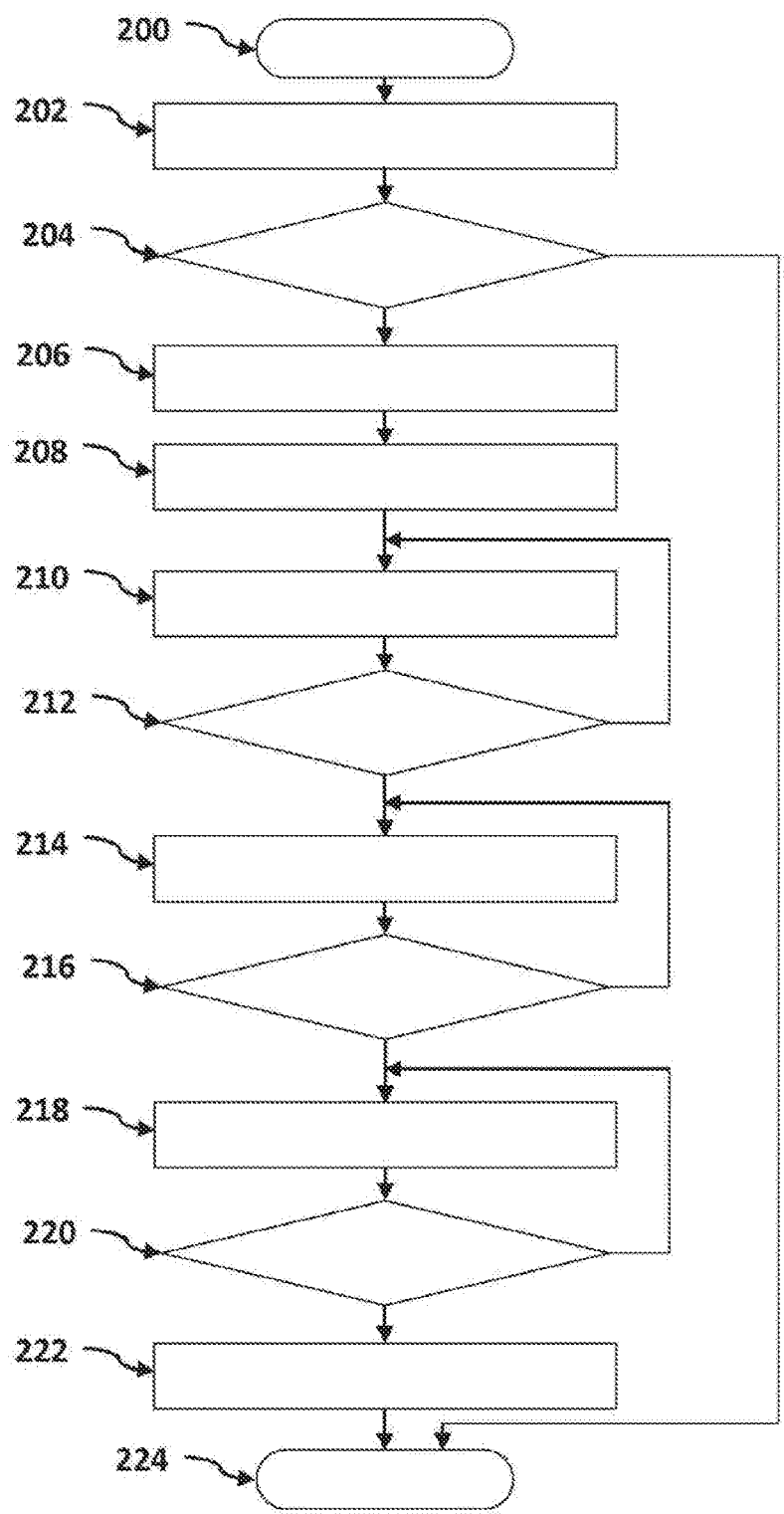
FIG. 3 is an example of a flow diagram for defect detection by the first control unit.

FIG. 3 shows an example of how the method of the invention is carried out for the first control unit.

After the method is started in step 200, the first control unit sends a request to the second control unit in step 202 to send an activity signal. In step 204, the first control unit checks whether an activity signal has been received from the second control unit. If the first control unit receives an activity signal from the second control unit within a first time interval, the method according to the invention ends with step 224. If the first control unit does not receive an activity signal from the second control unit within a first time interval, the first control unit switches into a configuration mode 206. In a step 208 which then follows, the first control unit transmits an error message via bus communication. This error message preferably contains the bus address of the second control unit detected as defective. All the units integrated into the bus communication can receive this error message and carry out predefined actions. In the following step 210, the first control unit transmits a configuration message containing the second bus address. Test step 212 checks for reception of an acknowledgement signal from the second control unit that the second bus address has been received. If the first control unit does not receive an acknowledgement signal in test step 212, step 210 is repeated. If the first control unit receives an acknowledgement signal from the second control unit in test step 212, the first control unit performs step 214 and sends a configuration message containing a configuration of the second control unit. In a test step 216, the first control unit checks whether an acknowledgement signal for successful of the second control unit has been received. If the first control unit does not receive this acknowledgement signal within a second time interval, step 214 is then repeated. If the first control unit receives an acknowledgement signal within a second time interval, it leaves the configuration mode in step 218 and the method ends with step 220.

Figure 4:
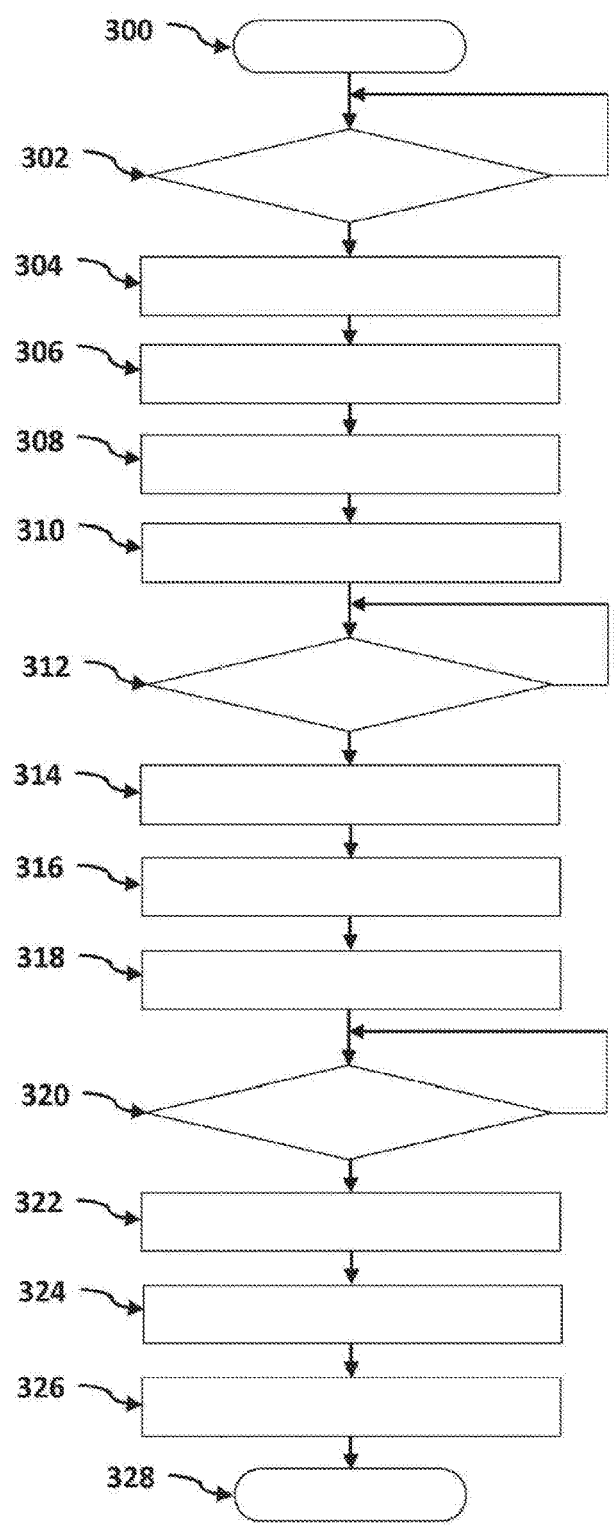
FIG. 4 is an example of a flow diagram for configuring the third control unit.

FIG. 4 shows an example of how the third control unit is configured.

After the third control unit has been integrated into the bus communication, the method starts in step 300. The third control unit then proceeds to a test step 302, in which the third control unit waits to receive a bus address, preferably as the content of a configuration message. If the third control unit does not receive any bus address within a third time interval, test step 302 is repeated. If the third control unit receives a bus address in test step 302, this bus address is stored in step 304. The stored bus address is used in the following step 306. The stored bus address is preferably adopted during ongoing operation of the control unit, preferably without the control unit restarting. In step 308 that then follows, the third control unit stores the bus address of the first control unit, which was preferably transferred as part of the configuration message to the third control unit. In step 310, the third control unit sends an acknowledgement signal to the first control unit to confirm that it has received the bus address. In the following test step 312, the third control unit waits to receive a configuration. If the third control unit does not receive a configuration within a third time interval, step 312 is repeated. If the third control unit does receive a configuration within a third time interval, step 314 is carried out, and the received configuration is stored. In step 316, which then follows, the stored configuration is applied within the third control unit. This is preferably done during ongoing operation of the third control unit and preferably does not require the third control unit to restart. In step 318, an acknowledgement signal is then sent to the first control unit, this acknowledging to the first control unit that a configuration has been received in the third control unit. In test step 320 which then follows, the third control unit checks whether the first control unit is transmitting the configuration of the first control unit. If the third control unit does not receive the configuration of the first control unit within a fourth time interval, step 320 is repeated. If the third control unit does receive a configuration of the first control unit within a fourth time interval, step 322 is carried out, in which the received configuration of the first control unit is stored in the third control unit. In the following step 324, the third control unit sends an acknowledgement signal to the first control unit to confirm that the configuration of the first control unit has been received. In step 326 that follows, the third control unit terminates the configuration mode and switches to step 328, in which the method according to the invention is terminated.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that many modifications are possible, e.g., variations in sizes, dimensions, structures, shapes and proportions of the various elements, values of parameters, mounting arrangements, use of materials, colors, orientations, etc.

without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure and method without departing from the concepts of the present disclosure, and further it is to be understood that such concepts are intended to be covered by the following claims unless these claims by their language expressly state otherwise.

The invention claimed is:

1. A method for replacing a defective control unit in a conveying device interconnected by a bus, said conveying device comprising a first control unit having a first bus address and at least one second control unit having a second bus address,
    wherein the first control unit controls a first conveyor segment and the second control unit controls a second conveyor segment,
    and the first control unit and the second control unit are interconnected via bus communication,
    said method comprising the steps of:
        (i) detecting the defect in the second control unit by means of the first control unit;
        (ii) switching the first control unit into a configuration mode when the first control unit detects a defect in the second control unit;
        (iii) integrating a third control unit into the bus communication after the first control unit has been put into the configuration mode;
        (iv) transferring a configuration from the first control unit to the third control unit or from the third control unit to the first control unit; and
        (v) storing the configuration transferred from the first control unit in the third control unit, or storing the configuration transferred from the third control unit in the first control unit.

2. The method pursuant to claim 1, wherein steps (iv) and (v) further comprise the steps of:
        (iv) transferring an individual bus address from the first control unit to the third control unit; and
        (v) storing the individual bus address transferred from the first control unit in the third control unit.

3. The method pursuant to claim 1, wherein the second control unit sends an activity signal via the bus communication and the first control unit receives the activity signal from the second control unit and the defect in the second control unit is detected in step (i) by the first control unit failing to receive the activity signal from the second control unit, in that the second control unit sends an activity signal at regular, predetermined intervals and a defective control unit is detected by the failure to receive the activity signal within the predetermined interval after receiving a preceding activity signal.

4. The method pursuant to claim 3, wherein the first control unit is put into the configuration mode by the failure to receive the activity signal.

5. The method pursuant to claim 3, wherein an error message is generated by the first control unit and transmitted via bus communication if the activity signal is not received in the first control unit.

6. The method pursuant to 2, wherein the third control unit transmits a presence signal after being integrated into the bus communication, and the first control unit is put into the configuration mode by receiving the presence signal from the third control unit.

7. The method pursuant to claim 2, wherein the third control unit is integrated, and wherein the second control unit is removed or the second control unit remains.

8. The method pursuant to claim 2, wherein in step (v), the third control unit stores a second bus address only if the third control unit receives from the first control unit a message which contains the first bus address of the first control unit and an individual bus address to be allocated to the third control unit.

9. The method pursuant to claim 2, wherein a third conveyor segment comprises a fourth control unit having a fourth bus address and the third control unit stores the individual bus address in step (v) only if the third control unit receives two messages,
    wherein the first message has been sent from the first control unit and contains the first bus address of the first control unit to be allocated to the third control unit, and
    the second message has been sent from the fourth control unit and contains the fourth bus address of the fourth control unit and the bus address to be allocated to the third control unit,
    wherein the individual bus address to be allocated to the third control unit is identical in both messages.

10. The method pursuant to claim 2, wherein the second bus address of the second control unit has been stored in the first control unit in a previous backup step and the first bus address of the first control unit has preferably been stored in the second control unit, and
    the third control unit is configured by means of the stored bus address from the second control unit, said method comprising the following steps:
        (a) transmitting the stored second bus address of the second control unit and said bus address being received by the third control unit;
        (b) storing in the third control unit the second bus address of the second control unit received by the third control unit; and
        (c) storing the first bus address of the first control unit in the third control unit.

11. The method pursuant to claim 10, wherein a configuration of the second control unit has been stored in the first control unit in a previous backup step, a configuration of the first control unit has been stored in the second control unit, and the third control unit is configured by means of the configuration of the second control unit stored in the first control unit.

12. The method pursuant to claim 10, wherein the bus address, either alone or in combination with the configuration of the second control unit, has been stored in a previous backup step in a control unit of a conveyor segment that is not immediately adjacent, and the bus address, either alone or in combination with the configuration of the control unit which is not immediately adjacent, has been stored in the second control unit.

13. The method pursuant to claim 10, wherein the bus address, either alone or in combination with the configuration of the second control unit, has been stored in a previous backup step in a plurality of control units, and the bus addresses, either alone or in combination with the configurations of the plurality of control units, have been stored in the second control unit.

14. The method pursuant to claim 2, wherein in a previous backup step, the second bus address of the second control unit, either alone or in combination with the configuration of the second control unit,
- has been stored in a backup unit, has been stored in a programmable logic controller, or has been stored on a web server, and
- wherein the individual bus addresses, either alone or in combination with the configurations of all the control units integrated in the bus communication, have been centrally stored in one unit.

15. The method pursuant to claim 1, wherein the configuration includes the full operating software of a control unit.

16. The method pursuant to claim 1, wherein the configuration includes one or more parts of the operating software of a control unit.

17. The method pursuant to claim 4, wherein the configuration includes a unique version identifier, by means of which the up-to-dateness of the configuration can be determined, in that a unique version identifier is allocated to an individual firmware version or software version of the operating software of a control unit.

18. The method pursuant to claim 6, wherein step (v) is carried out and step (vi) is added as follows:
   (v) comparing the version identifier of the configuration of the first control unit with the version identifier of the configuration of the third control unit, preferably in the first or the third control unit;
   (vi) if the version identifier of the first control unit is more up-to-date that the version identifier of the third control unit, then storing the configuration transferred from the first control unit;
   or, if the version identifier of the first control unit is more up-to-date than the version identifier of the third control unit then:
   (a) transferring the configuration of the first control unit to the third control unit; and
   (b) storing the transferred configuration of the first control unit in the third control unit.

19. The method pursuant to claim 6, wherein step (v) is carried out and step (vi) is added as follows:
   (v) comparing the version identifier of the configuration of the first control unit with the version identifier of the configuration of the third control unit, preferably in the first or the third control unit;
   (vi) if the version identifier of the first control unit is more up-to-date than the version identifier of the third control unit, then:
   storing the configuration transferred from the first control unit to the third control unit, otherwise:
   (a) transferring the configuration of the third control unit to the first control unit, and
   (b) storing the transferred configuration of the third control unit in the first control unit;
   or, if the version identifier of the third control unit is more up-to-date than the version identifier of the first control unit, then:
   storing the configuration transferred from the third control unit to the first control unit, otherwise:
   (a) transferring the configuration of the first control unit to the third control unit, and
   (b) storing the transferred configuration of the first control unit in the third control unit.

20. The method pursuant to claim 17, wherein steps (v) and (vi) are carried out and steps (vii) and (viii) are added as follows:
   (v) comparing the version identifier of the configuration of the first control unit with the version identifier of the configuration of the third control unit, preferably in the first or the third control unit;
   (vi) retrieving the state of a configuration direction setting in the first or third control unit by means of the first or third control unit;
   (vii) determining the configuration having the more up-to-date version identifier or having the older version identifier, depending on the detected state of a configuration direction setting; and
   (viii) if the configuration with the more up-to-date version identifier is not the configuration of the first or third control unit:
   (a) transferring the configuration with the more up-to-date version identifier from the first or third control unit to the third or first control unit, and
   (b) storing the transferred configuration of the first or third control unit in the third or first control unit;
   or, if the configuration with the older version identifier is not the configuration of the first or third control unit,
   (a) transferring the configuration with the older version identifier from the first or third control unit to the third or first control unit; and
   (b) storing the transferred configuration of the first or third control unit in the third or first control unit.

21. The method pursuant to claim 1, wherein steps (iv) and (v) are carried out as follows:
   (iv) the first or third control unit retrieves the state of a configuration direction setting in the first or third control unit;
   (v) if the configuration direction setting has a first state, transferring the configuration of the first control unit to the third control unit and storing the transferred configuration in the third control unit; or
   if the configuration direction setting has a second state, transferring the configuration of the third control unit to the first control unit and storing the transferred configuration in the first control unit.

22. The method pursuant to claim 20, wherein step (vi) is carried out as follows:
   (a) the first or third control unit retrieves the state of a configuration direction setting in the first or third control unit;
   (b) the third or first control unit signals, by means of an optical or acoustic signal unit, whether the version identifier of the configuration of the third control unit has a more up-to-date or an older, an identical version identifier compared to the version identifier of the configuration of the first control unit;
   (c) a user changes the state of the configuration direction setting in the first or third control unit; and (d) the first or third control unit retrieves the state of the configuration direction setting in the first or third control unit.

23. The method pursuant to claim 22, wherein the state of the configuration direction setting in the first or third control unit is changed by operating a contact, a switch or a sensor at and/or in a control unit, or is changed by a central unit via bus communication.

24. The method pursuant to claim 1, wherein the configuration stored in the first control unit is transferred in a downstream distribution step from the first or third control unit to a plurality of control units and is stored in said plurality of control units.

25. The method pursuant to claim 1, wherein the configuration is formed by a bus address and a complete operating software, or part of an operating software.

26. A conveying device, comprising a first control unit having a first bus address and at least a second control unit having a second bus address, wherein the first control unit monitors and controls a first conveyor segment and the second control unit monitors and controls a second conveyor segment, the first control unit and the second control unit being interconnected via bus communication, wherein:
  (i) the first control unit is adapted to detect a defect in the second control unit;
  (ii) the first control unit is adapted to switch into a configuration mode when the first control unit detects the defect in the second control unit;
  (iii) the first control unit is adapted to be put into a configuration mode;
  (iv) the first control unit is adapted to transfer a configuration from the first control unit to a third control unit, and the third control unit is adapted to transfer a configuration to the first control unit; and
  (v) the third control unit is adapted to store the configuration transferred from the first control unit, and the first control unit is adapted to store the configuration transferred from the third control unit.

27. The conveying device pursuant to claim 26, wherein features (iv) and (v) are adapted as follows:
  (iv) the first control unit is adapted to transfer an individual bus address from the first control unit to the third control unit; and
  (v) the third control unit is adapted to store the individual bus address transferred from the first control unit.

28. The conveying device pursuant to claim 27, wherein:
the second control unit is adapted to transmit an activity signal via bus communication;
the first control unit is adapted to detect a defect in the second control unit on the basis of its not receiving an activity signal from the second control unit; and
the first control unit is adapted to detect a defect in the second control unit on the basis of its not receiving an activity signal within a predetermined interval after receiving a preceding activity signal.

29. The conveying device pursuant to claim 27, wherein the first control unit is adapted to be put into the configuration mode by the failure to receive the activity signal.

30. The conveying device pursuant to claim 27, wherein the first control unit is adapted such that an error message is generated by the first control unit and transmitted via the bus communication if the activity signal is not received in the first control unit.

31. The conveying device pursuant to claim 27, wherein the third control unit is adapted to transmit a presence signal after it has been integrated into the bus communication, and the first control unit is adapted to be put into the configuration mode by receiving the presence signal from the third control unit.

32. The conveying device pursuant to claim 27, wherein the second conveyor segment is adapted to integrate the third control unit, wherein:
  the second control unit is removed from the second conveyor segment, or
  the second control unit remains in the second conveyor segment.

33. The conveying device pursuant to claim 27, wherein the third control unit is adapted to store an individual bus address in step (v) only if the third control unit receives a message from the first control unit containing the first bus address of the first control unit and the second bus address to be allocated to the third control unit.

34. The conveying device pursuant to claim 27, wherein the conveying device includes a third conveyor segment and a fourth control unit having a fourth bus address and the third control unit is adapted to store the individual bus address in step (v) only if the third control unit receives two messages,
  wherein the first message has been sent from the first control unit and contains the first bus address of the first control unit and the second bus address to be allocated to the third control unit, and
  the second message has been sent from the fourth control unit and contains the fourth bus address of the fourth control unit and the second bus address to be allocated to the third control unit; and
  wherein the second bus address to be allocated to the third control unit is identical in both messages.

35. The conveying device pursuant to claim 27, wherein the first control unit is adapted to store the second bus address of the second control unit in a backup step carried out before step (i), the second control unit is adapted to store the first bus address of the first control unit, and the third control unit is adapted to be configured by means of the stored bus address of the second control unit, wherein:
  the first control unit is adapted to transmit the stored second bus address of the second control unit;
  the third control unit is adapted to store the received second bus address of the second control unit; and
  the third control unit is adapted to store the bus address of the first control unit.

36. The conveying device pursuant to claim 27, wherein the first control unit is adapted to store a configuration of the second control unit in a previous backup step,
  the second control unit is adapted to store a configuration of the first control unit in a previous backup step; and
  the third control unit is adapted to be configured by means of a stored configuration of the second control unit.

37. The conveying device pursuant to claim 27, wherein a control unit is adapted to store, in a previous backup step, the bus address, either alone or in combination with a configuration of a control unit of a conveyor segment which is not immediately adjacent, and
  the second control unit is adapted to store the bus address, either alone or in combination with a configuration of a control unit which is not immediately adjacent.

38. The conveying device pursuant to claim 27, wherein a control unit is adapted to store, in a previous backup step, the bus address, either alone or in combination with a configuration of the second control unit conveyor segment, in a plurality of control units, and the second control unit is adapted to store the bus address, either alone or in combination with a configuration, in a plurality of control units.

39. The conveying device pursuant to claim 27, further comprising:
   a backup unit,
   a programmable logic control, or
   a web server adapted to store the second bus address of the second control unit, either alone or in combination with the configuration of the second control unit, in a previous backup step, and is adapted to store in a central location the individual bus addresses, either alone or in combination with the configurations of all the control units integrated into the bus communication.

40. The conveying device pursuant to claim 28, wherein the configuration includes the full operating software of a control unit.

41. The conveying device pursuant to claim 28, wherein the configuration includes parts of the operating software of a control unit.

42. The conveying device pursuant to claim 40, wherein the configuration includes a unique version identifier, by means of which the development status of the configuration can be determined, wherein the version identifier is allocated to an individual firmware version or software version of the operating software of a control unit.

43. The conveying device pursuant to claim 42, wherein the first or third control unit is adapted to compare the version identifier of the configuration.

44. The conveying device pursuant to claim 42, wherein the first or third control unit is adapted to retrieve a state of a configuration direction setting in the first or third control unit, with regard to a first or second state.

45. The conveying device pursuant to claim 42, wherein the first or third control unit is adapted to transfer the configuration stored in the first control to a plurality of control units in a downstream distribution step, and said plurality of control units is adapted to store the transferred configuration.

46. The conveying device pursuant to claim 42, wherein the first or third control unit is adapted to determine the configuration having the more up-to-date version identifier or having the older version identifier.

47. The conveying device pursuant to claim 42, wherein the first or third control unit is adapted to change the state of the configuration direction setting in the first or third control unit by operating a contact, a switch or a sensor at or in a control unit, or to change the state of the configuration direction setting by means of a central unit via bus communication.

48. The conveying device pursuant to claim 42, wherein the first or third control unit is adapted to signal, by means of an optical or acoustic signal unit, whether the version identifier of the configuration of the third control unit has a more up-to-date or an older or an identical version identifier compared to the version identifier of the configuration of the first control unit.

* * * * *